US011551317B2

(12) United States Patent
Choi et al.

(10) Patent No.: US 11,551,317 B2
(45) Date of Patent: Jan. 10, 2023

(54) PROPERTY VALUATION MODEL AND VISUALIZATION

(71) Applicant: S&P Global Inc., New York, NY (US)

(72) Inventors: Hyunyoung Choi, Boston, MA (US); Hao Yan, Davis, CA (US); Xu Cai, New York, NY (US); Qiuhao Zhang, Boston, MA (US); Dun Wang, New York, NY (US); Hao Jiang, New York, NY (US)

(73) Assignee: S&P Global Inc., New York, NY (US)

( * ) Notice: Subject to any disclaimer, the term of this patent is extended or adjusted under 35 U.S.C. 154(b) by 163 days.

(21) Appl. No.: 16/807,440

(22) Filed: Mar. 3, 2020

(65) Prior Publication Data

US 2021/0279824 A1    Sep. 9, 2021

(51) Int. Cl.
*G06Q 50/16* (2012.01)
*G06Q 30/02* (2012.01)

(52) U.S. Cl.
CPC ......... *G06Q 50/16* (2013.01); *G06Q 30/0206* (2013.01)

(58) Field of Classification Search
CPC ............................ G06Q 30/0206; G06Q 50/16
USPC ........................................................ 705/313
See application file for complete search history.

(56) References Cited

U.S. PATENT DOCUMENTS

| | | | | |
|---|---|---|---|---|
| 5,361,201 A * | 11/1994 | Jost | ........................ | G06Q 40/00 705/35 |
| 6,609,118 B1 * | 8/2003 | Khedkar | ................ | G06Q 10/10 705/27.1 |
| 7,076,452 B2 * | 7/2006 | Florance | ................ | G06Q 30/06 340/988 |
| 8,166,048 B2 * | 4/2012 | Wong | ...................... | G06F 16/25 707/748 |
| 8,738,388 B1 * | 5/2014 | An | ........................ | G06Q 50/16 705/1.1 |
| 10,387,389 B2 * | 8/2019 | Kabra | ................... | G06F 16/215 |

(Continued)

OTHER PUBLICATIONS

Jalles, João Tovar, Structural Time Series Models and the Kalman Filter: A Concise Review (Jun. 19, 2009). FEUNL Working Paper No. 541, available at SSRN: https://ssrn.com/abstract=1496864. (Year: 2009).*

(Continued)

*Primary Examiner* — Maria C Santos-Diaz
(74) *Attorney, Agent, or Firm* — Yee & Associates, P.C.

(57) ABSTRACT

Automated property value calculation is provided. The method comprises receiving historic transaction data for a group of real estate properties over a specified time and receiving characteristic data regarding the properties for a number of defined categories. Historic data is also received for a number of demographic parameters over the specified time. The demographic data corresponds to regions in which the properties are located. A predictive valuation model is built with the financial transaction data, characteristic data, and demographic data. Individual values are calculated with the predictive valuation model for a new group of real estate properties according to their characteristics. The individual values are then aggregated. Financial transaction data is received for the new group of properties, and a net asset value of the new group of properties is calculated according to the aggregated valuations and financial transaction data.

19 Claims, 10 Drawing Sheets

(56) References Cited

U.S. PATENT DOCUMENTS

| | | | | |
|---|---|---|---|---|
| 2004/0254872 | A1* | 12/2004 | Grzebeta | G06Q 40/06 |
| | | | | 705/36 R |
| 2006/0015357 | A1* | 1/2006 | Cagan | G06Q 30/0278 |
| | | | | 705/306 |
| 2011/0289010 | A1* | 11/2011 | Rankin, Jr. | G06Q 50/16 |
| | | | | 705/313 |
| 2014/0164260 | A1* | 6/2014 | Spieckerman | G06Q 30/0278 |
| | | | | 705/306 |
| 2015/0012335 | A1* | 1/2015 | Xie | G06Q 10/067 |
| | | | | 705/7.31 |
| 2015/0058234 | A1* | 2/2015 | Dozier | G06Q 50/165 |
| | | | | 705/315 |
| 2015/0242747 | A1* | 8/2015 | Packes | G06Q 50/16 |
| | | | | 706/17 |
| 2015/0332371 | A1* | 11/2015 | Lomas | G06F 3/04842 |
| | | | | 705/26.62 |
| 2019/0213645 | A1* | 7/2019 | Webb | G06Q 50/167 |
| 2020/0234151 | A1* | 7/2020 | Resnick | G06K 9/6256 |

OTHER PUBLICATIONS

Roberto Dieci • Frank Westerhoff, A simple model of a speculative housing market, Dec. 6, 2011 (Year: 2011).*
Xiaojin Sun, Essays on Housing Markets and Monetary Policy, Apr. 22, 2015 (Year: 2015).*
M William Sermons, Incorporating Systematic Taste Variation into Models of Residential Location Choice, Jun. 1998 (Year: 1998).*
Kok et al., "Big Data in Real Estate? From Manual Appraisal to Automated Valuation," The Journal of Portfolio Management, Special Real Estate Issue, 2017, pp. 202-211.

* cited by examiner

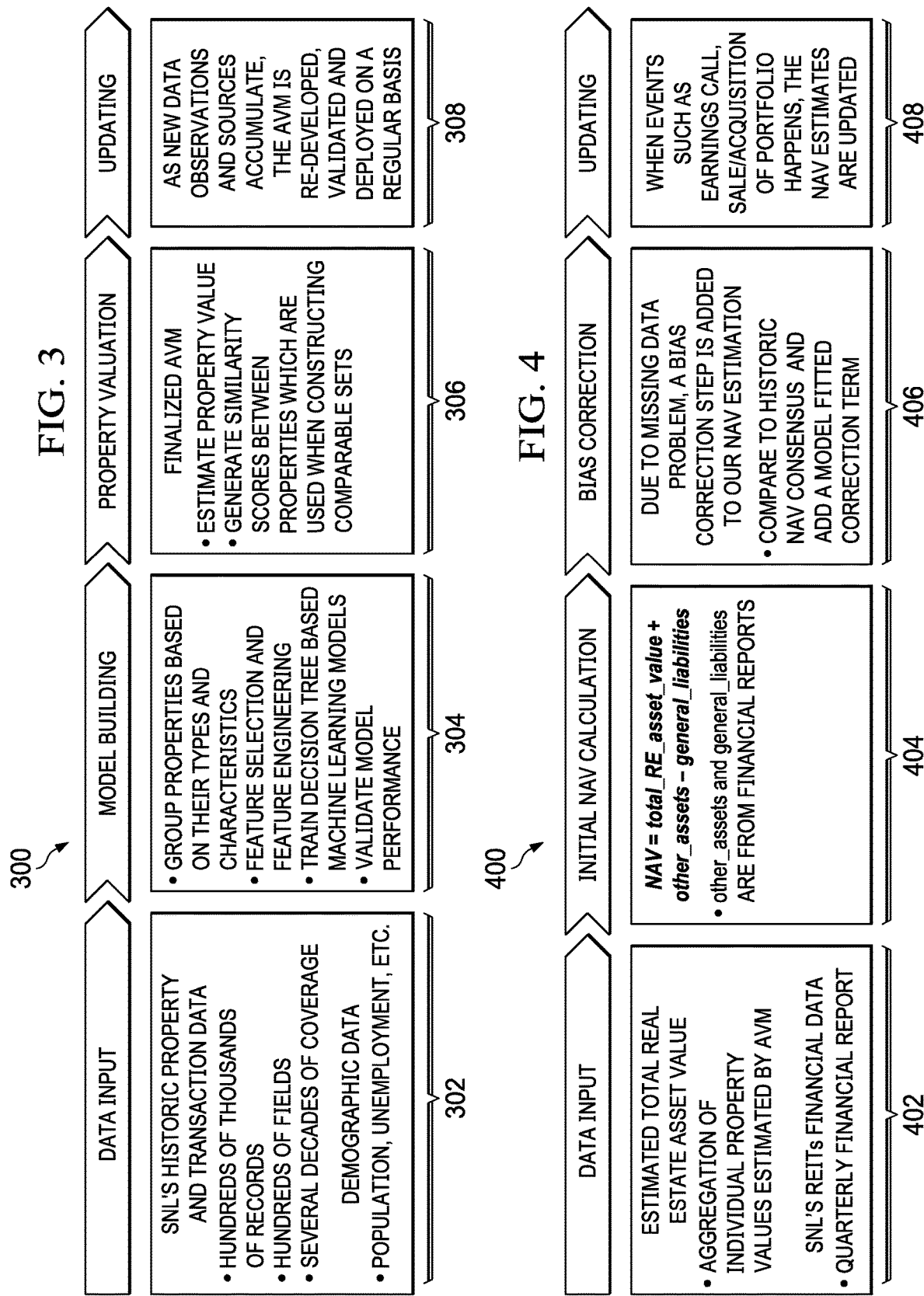

PROPERTY VALUATION MODEL AND VISUALIZATION

BACKGROUND INFORMATION

1. Field

The present disclosure relates generally to computer-implemented predictive modeling, and more specifically to automated valuation of commercial real estate.

2. Background

Valuing commercial real estate is typically a very subjective process. Valuation of real estate investment trusts (REITs) traditionally uses Net Operating Income (NOI) and capitalization rate to determine the total real estate value of a REIT. The NOI and capitalization rate can be combined with other items from financial reports to arrive at a top-down net asset value (NAV) estimate.

Ideally, each property held by a REIT should be valued individually to obtain the total real estate property value of the REIT. Income capitalization approach requires the NOI and capitalization for each property. The capitalization rate depends on property type, location, specific market, etc.

In practice, REITs own large numbers of properties with different properties types in different markets. Analysts typically pick a single market capitalization rate for a REIT based on the REIT's portfolio and the analysts' experience. They then combine the single capitalization rate with REIT-level financial information to device NAV estimates.

Therefore, it would be desirable to have a method and apparatus that take into account at least some of the issues discussed above, as well as other possible issues.

SUMMARY

An embodiment of the present disclosure provides a method for automated property value calculation. The method comprises receiving historic transaction data for a group of real estate properties over a specified time and receiving characteristic data regarding the properties for a number of defined categories. Historic data is also received for a number of demographic parameters over the specified time. The demographic data corresponds to regions in which the properties are located. A predictive valuation model is built with the financial transaction data, characteristic data, and demographic data. Individual values are calculated with the predictive valuation model for a new group of real estate properties according to their characteristics. The individual values are then aggregated. Financial transaction data is received for the new group of properties, and a net asset value of the new group of properties is calculated according to the aggregated valuations and financial transaction data.

Another embodiment of the present disclosure provides a system for automated property value calculation. The system comprises a storage device configured to store program instructions and one or more processors operably connected to the storage device and configured to execute the program instructions to cause the system to: receive historic financial transaction data for a first number of real estate properties over a specified time frame; receive characteristic data regarding the first number of real estate properties, wherein the characteristic data comprises a number of defined categories; receive historic demographic data for a number of demographic parameters over the specified time frame, wherein the demographic data corresponds to defined geographic regions in which the first number of real estate properties are located; build a predictive valuation model based on the financial transaction data, the characteristic data, and the demographic data; calculate individual values for a second number of real estate properties with the predictive valuation model according to characteristics of the second number of real estate properties; aggregate the individual values of the second number of real estate properties; receive financial transaction data for the second number of real estate properties; and calculate a net asset value of the second number of real estate properties according to the aggregated valuations and financial transaction data.

Another embodiment of the present disclosure provides a computer program product for automated property value calculation. The computer program product comprises a non-volatile computer readable storage medium having program instructions stored thereon to perform the steps of: receiving historic financial transaction data for a first number of real estate properties over a specified time frame; receiving characteristic data regarding the first number of real estate properties, wherein the characteristic data comprises a number of defined categories; receiving historic demographic data for a number of demographic parameters over the specified time frame, wherein the demographic data corresponds to defined geographic regions in which the first number of real estate properties are located; build a predictive valuation model based on the financial transaction data, the characteristic data, and the demographic data; calculating individual values for a second number of real estate properties with the predictive valuation model according to characteristics of the second number of real estate properties; aggregating the individual values of the second number of real estate properties; receiving financial transaction data for the second number of real estate properties; and calculating a net asset value of the second number of real estate properties according to the aggregated valuations and financial transaction data.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 3 is an illustration of a block diagram illustrating the operation of an automated valuation model in accordance with an illustrative embodiment;

FIG. 4 is an illustration of a block diagram illustrating the operation of ground up net asset value estimation in accordance with an illustrative embodiment;

DETAILED DESCRIPTION

The illustrative embodiments recognize and take into account one or more different considerations. For example, the illustrative embodiments recognize and take into account that valuation of real estate investment trusts (REITs) uses Net Operating Income (NOI) and capitalization rate to determine the total real estate value of a REIT. The adjustment to capitalization rate can be both subjective and hard to quantify.

The illustrative embodiments also recognize and take into account that each property held by a REIT should be valued individually to obtain the total real estate property value of the REIT. However, analysts typically pick a single market capitalization rate for a REIT based on the REIT's portfolio and the analysts' experience, despite the heterogeneous nature of real estate properties often held by REITs.

The illustrative embodiments provide a method for ground-up net asset valuation (NAV) estimation that generates an automate valuation for each property owned by a REIT. Instead of using market capitalization, property values are computers using property transaction data through machine learning. The automated valuation takes into account property type, location, and market when valuing properties.

Figure 1:
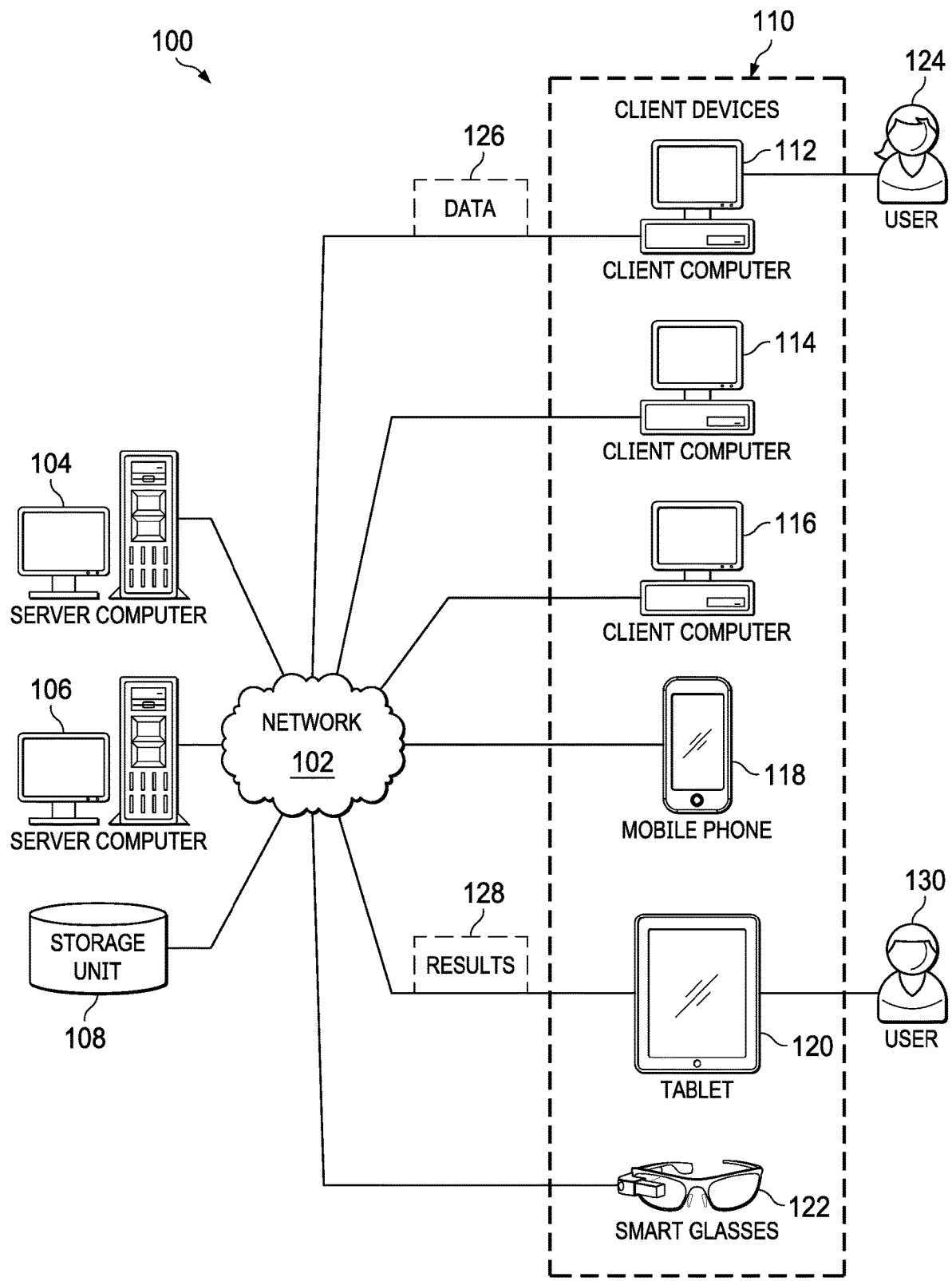
FIG. 1 is an illustration of a network of data processing systems in which illustrative embodiments may be implemented.

With reference now to the figures and, in particular, with reference to FIG. 1, a pictorial representation of a network of data processing systems is illustrated in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or network computers. As depicted, client devices 110 include client computers 112, 114, and 116. Client devices 110 can also include other types of client devices such as mobile phone 118, tablet computer 120, and smart glasses 122.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium. Data and applications generated by the code might downloaded to a data processing system or other device for use. For example, the program code can be stored on a computer-recordable storage medium on server computer 104, and data and applications generated by the code might be downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, user 124 at client computer 112 can enter data 126 for processing on server computer 104 and storage in a database, e.g., on storage unit 108. In this illustrative example, server computer 104 might produce computational results 128 supplied to user 130 operating tablet computer 120.

There are three main categories of machine learning: supervised, unsupervised, and reinforcement learning. Supervised machine learning comprises providing the machine with training data and the correct output value of the data. During supervised learning the values for the output are provided along with the training data (labeled dataset) for the model building process. The algorithm, through trial and error, deciphers the patterns that exist between the input training data and the known output values to create a model that can reproduce the same underlying rules with new data. Examples of supervised learning algorithms include regression analysis, decision trees, k-nearest neighbors, neural networks, and support vector machines.

If unsupervised learning is used, not all of the variables and data patterns are labeled, forcing the machine to discover hidden patterns and create labels on its own through the use of unsupervised learning algorithms. Unsupervised learning has the advantage of discovering patterns in the data with no need for labeled datasets. Examples of algorithms used in unsupervised machine learning include k-means clustering, association analysis, and descending clustering.

Whereas supervised and unsupervised methods learn from a dataset, reinforcement learning methods learn from interactions with an environment. Algorithms such as Q-learning are used to train the predictive model through interacting with the environment using measurable performance criteria.

Figure 2:
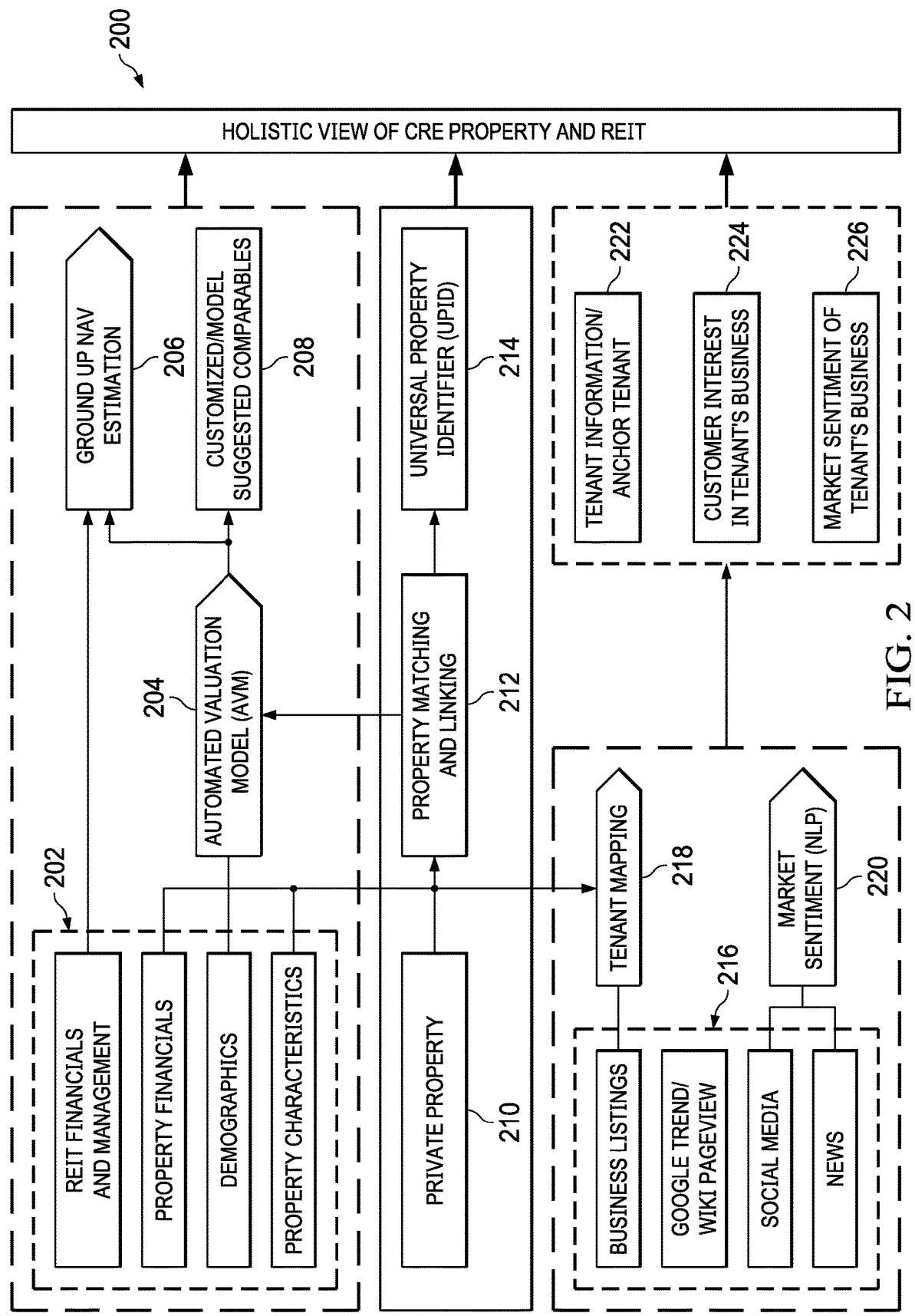
FIG. 2 is an illustration of a block diagram illustrating the operation of an automated property valuation system in accordance with an illustrative embodiment.

FIG. 2 illustrates a block diagram illustrating the operation of an automated property valuation system in accordance with an illustrative embodiment. System 200 might be implemented in a data processing environment such as Network data processing system 100 shown in FIG. 1.

System 200 receives real estate data 202 from a number of data sources. This data might comprise, e.g., real estate investment trust (REIT) financial and management information, property financial transaction information, demographic data, and information about the characteristics of the properties.

The real estate data 202 is used to build an automated valuation model (AVM) 204, which can be used to predict property values in real time as new information come to the market. The AVM 204 can be used to calculate a net asset value (NAV) estimation 206 for a portfolio of properties from the ground up. AVM 204 can also customize/model suggested comparables 208 between properties.

Private property listings 210 from other real estate-specific data sources can also be used in building the AVM 204. Property matching and linking 212 between data sources can be used to create universal property identifiers (UPID) 214 to account for references to the same properties in different data sources.

Additional insight into property values can also be gained by tenant mapping 218 to account for tenant occupancy that might not be captured by real estate-specific data sources. Market sentiment 220 regarding properties might also be gleaned from natural language processing (NLP) of alternative, non-real estate-specific data sources 216 such as, e.g., news reports, social media, business listings, and general purposed online data sources comprising unstructured data.

Tenant mapping 218 and market sentiment 220 might be used to identify, e.g., tenant information and anchor tenants 222 in commercial real estate properties, customer interest in a tenant's business 224, and market sentiment about a tenant's business 226, which all contribute to the potential cashflow and overall valuation of commercial real estate.

FIG. 3 illustrates a block diagram illustrating the operation of an automated valuation model in accordance with an illustrative embodiment. AVM 300 might be a detailed view of AVM 204 in FIG. 2.

Input data 302 might comprise historic property and transaction data and demographic data such as population, employment rates, etc. that are relevant to changes in property values. This dataset might comprise hundreds of thousands of records across hundreds of categories and cover several decades.

The model building 304 groups and categorizes the input dataset and employs decision tree-based machine learning algorithms. The machine learning techniques can employ a number of feature transformation and encoding methods and extensive back-testing for feature selection. Examples of learning algorithms include gradient boosting tree and random forest.

Property valuation 306 is able to estimate property values using similarity scores between properties. Model updating 308 retrains and updates the AVM as new data is collected.

AVM 300 is a purely data driven, machine learning based model in contrast to human appraisers that rely on subjective personal and field experience. The AVM continually improves as new data becomes available, maintaining near real-time accuracy, and is able to estimate millions of property values in minutes.

FIG. 4 illustrates a block diagram illustrating the operation of ground up NAV estimation in accordance with an illustrative embodiment. NAV 400 might be a detailed view of NAV 206 in FIG. 2.

Input data 402 for NAV 400 might comprise an estimated total real estate asset value of a portfolio based on aggregating individual property values calculated by AVM 204. Input data 402 might also comprise real estate financial data from, e.g., REIT data sources.

An initial NAV calculation 404 might be made by subtracting liabilities from the sum of total (aggregated) real estate value and other assets. A bias correction 406 can be added to the initial NAV calculation 404 to account for missing data. Updating 408 can also occur for the ground up NAV estimation 400 as new transaction data becomes available.

Machine learning techniques such as time series analysis and Kalman filtering can be applied to the NAV calculation and bias correction. Ground up NAV estimation 400 can estimate value for each property in a portfolio based on its type, location, conditions, etc., thereby provide a finer level of granularity in the estimate than traditional methods that apply a single, general capitalization rate across all properties in the portfolio. Ground up NAV estimation 400 can also capture changes in NAV as transactions occur, which is difficult to do with traditional NAV estimation that relies on a single capitalization rate for a group of properties within a portfolio.

Figure 5:
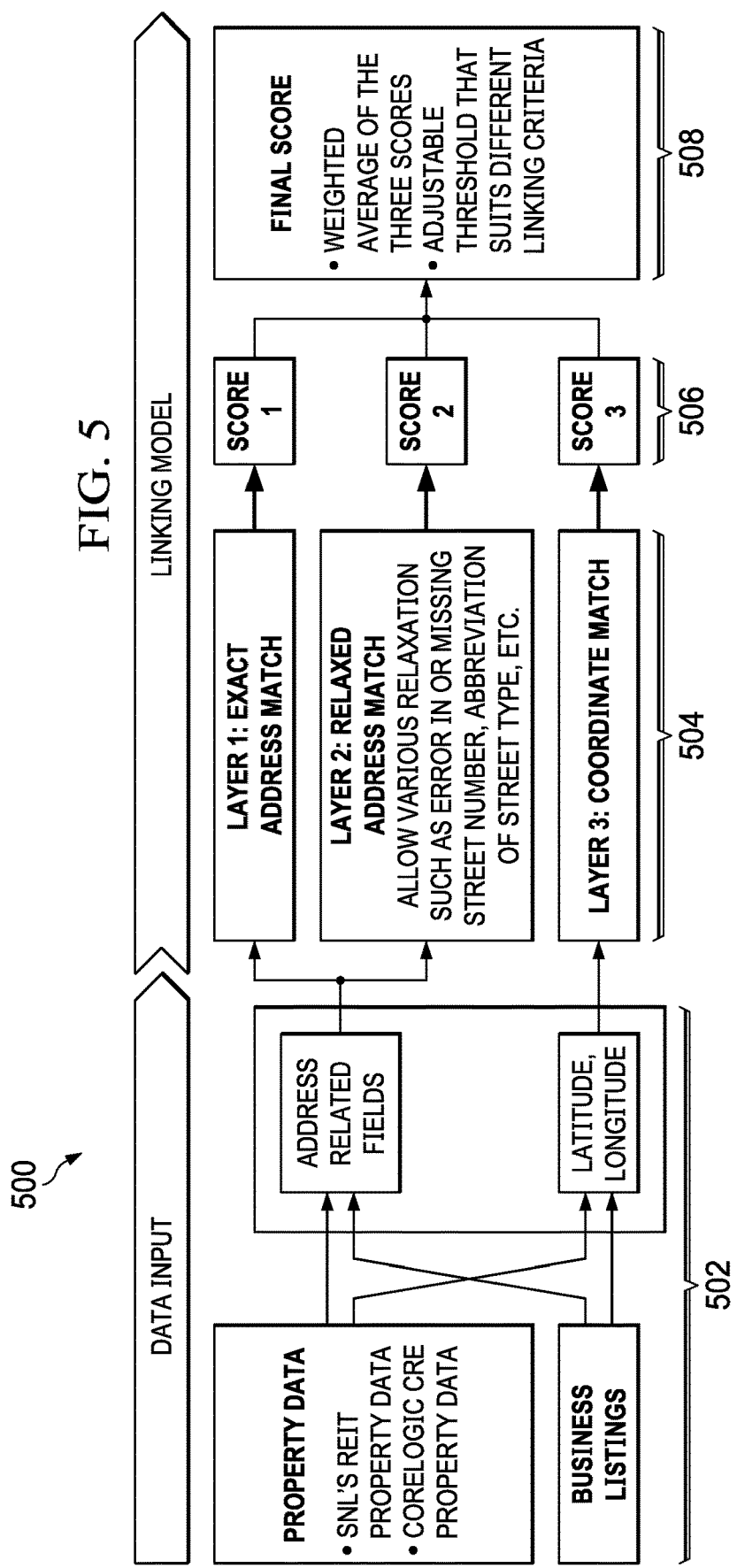
FIG. 5 is an illustration of a block diagram illustrating the operation of tenant linking in accordance with an illustrative embodiment.

FIG. 5 illustrates a block diagram illustrating the operation of tenant linking in accordance with an illustrative embodiment. Tenant linking 500 might be a detailed view of tenant mapping 218 in FIG. 2.

Input data 502 might comprise property level data from real estate-specific data sources and non-real estate-specific data sources such as business listings. Both types of data sources might contain respective information regarding the address and locations of properties and tenants/businesses, which can be cross-referenced against each other.

Multiple layers 504 of the linking model provide a rule-based approach to correlating different data sources according to different levels of confidence in matches. Scores 506 for each level can be combined into a final score 508 that provides a level of confidence that a tenant not listed by real estate-specific data sources is in fact a tenant in a given property.

Figure 6:
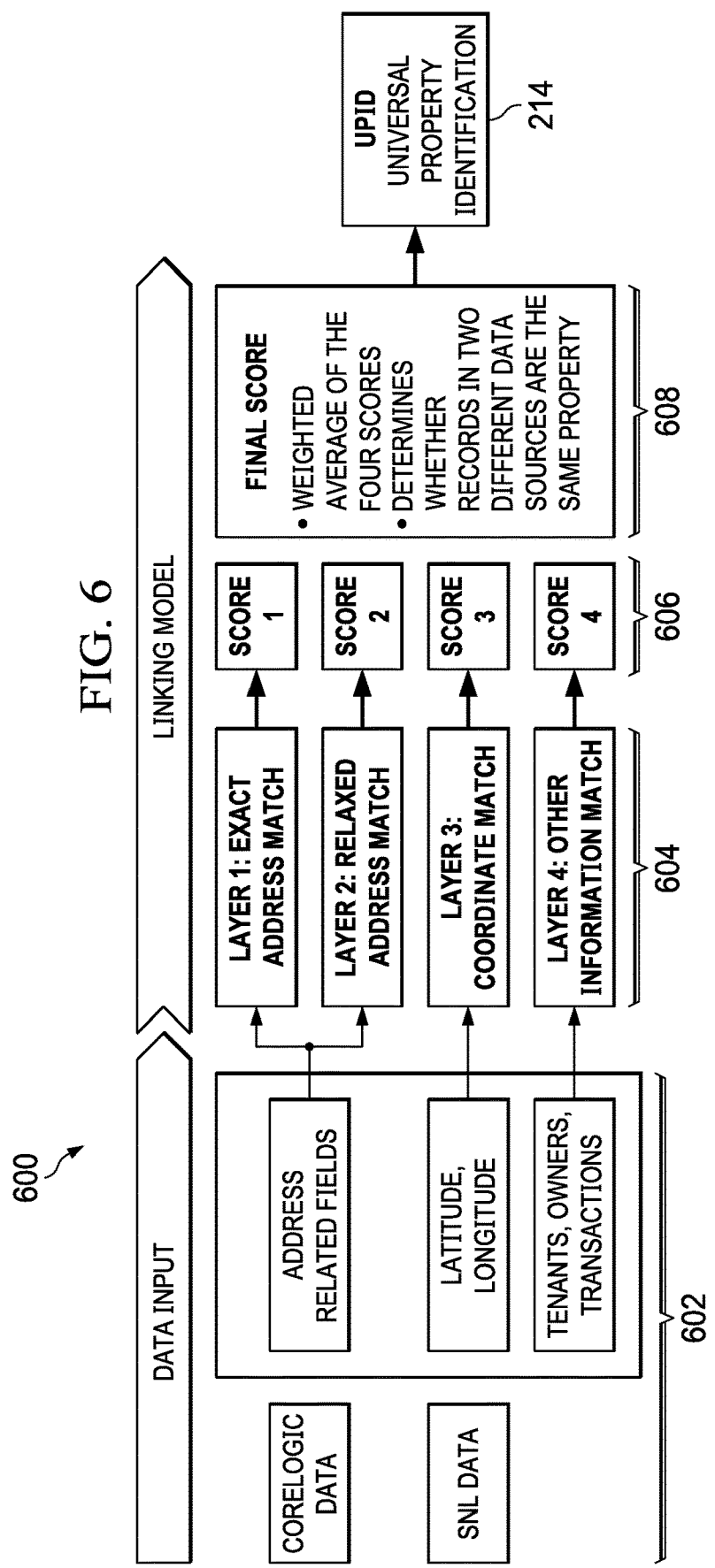
FIG. 6 is an illustration of a block diagram illustrating the operation of property linking in accordance with an illustrative embodiment.

FIG. 6 illustrates a block diagram illustrating the operation of property linking in accordance with an illustrative embodiment. Property linking 600 might be a detailed view of property matching and linking 212 in FIG. 2.

Different data sources have different definitions of a commercial real estate (CRE) property. For example, some sources use REITs reported information while other sources use parcel number assigned by a governmental property. Combining and linking these different data sources enables the creation a universal identification number for each property in the CRE market.

Input data comprises different sources 602 that provide information about property locations and other identifying information. Multiple layers 604 of the linking model correlate different data sources according to different levels of confidence in matches. Scores 606 for each level can be combined into a final score 608 that provides a level of confidence regarding when records in different data sources are referring to the same property, allowing the creation of UPID 214 in FIG. 2. Scoring by the linking model 604 might employ techniques such as, e.g., string normalization and string similarity.

Figure 7:
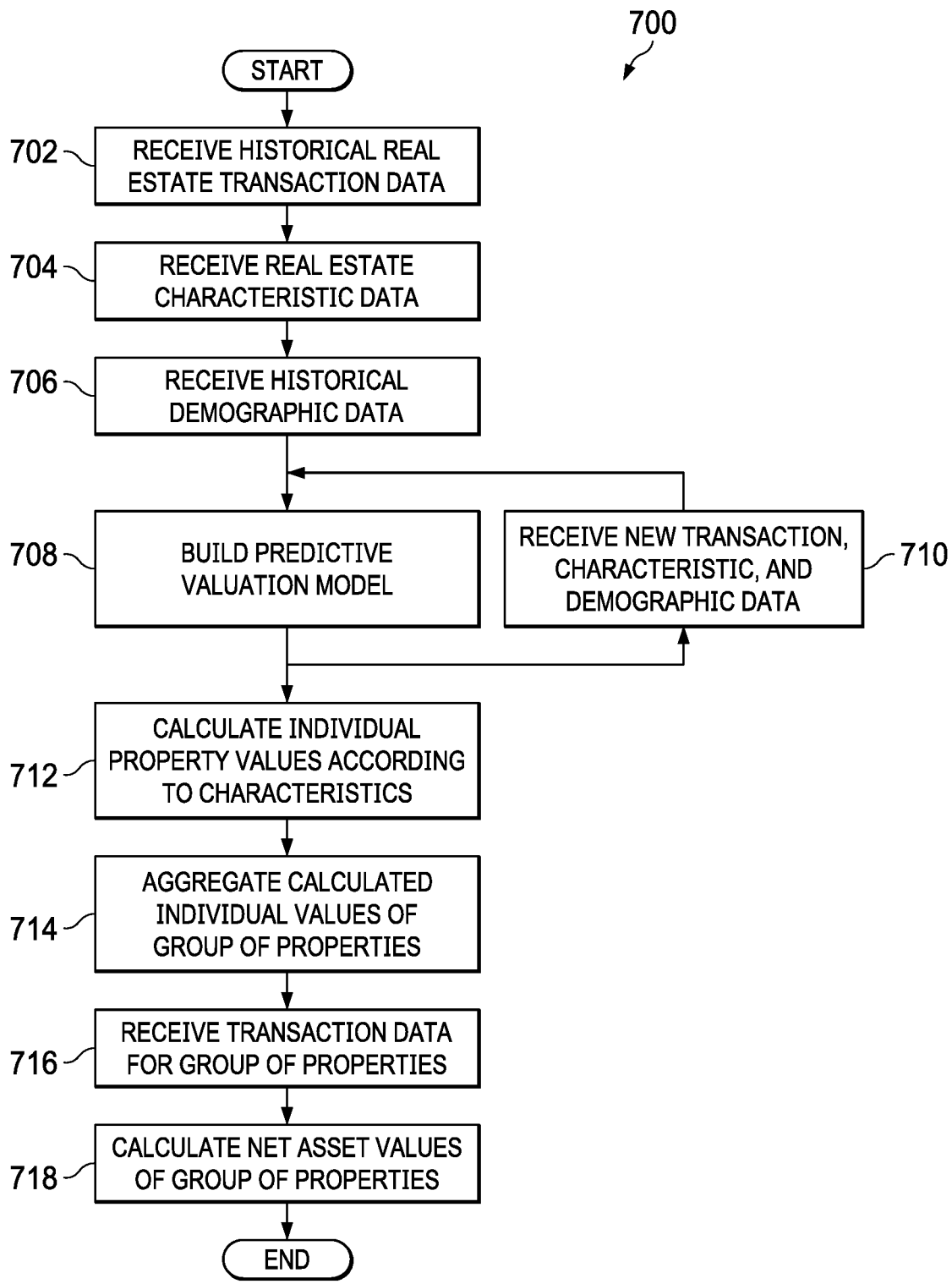
FIG. 7 is an illustration of a flowchart of a process for automated property value calculation in accordance with an illustrative embodiment.

FIG. 7 illustrates a flowchart of a process for automated property value calculation in accordance with an illustrative embodiment. Process 700 might be implemented in property valuation system 200 in FIG. 2

Process 700 begins with the system receiving historic financial transaction data for real estate properties over a specified time frame (step 702) and receiving data about characteristics of the real estate properties within a number of defined categories (step 704). Historic demographic data is also received for a number of demographic parameters over the specified time frame (step 706). This demographic data might correspond to defined geographic regions in which the real estate properties are located.

As explained above, the information received in steps 702-706 might comprise up to hundreds of thousands of real estate records or more and cover a time period of one or more decades. A predictive valuation model is then trained built on this historic transaction, characteristic, and demographic data as a training dataset (step 708). The predictive valuation model might comprise decision tree-based algorithms such as, e.g., gradient boosting tree and random forest learning models.

As new real estate financial transaction data, characteristic data, and demographic data are received at specified periodic time intervals, the new data for each time interval can be used to regularly retrain and update the predictive valuation model (step 710).

After training the predictive model on the historic records, the predictive model can be used to calculate individual values for a given portfolio of real estate properties according to characteristics of the properties in the portfolio (step 712). The calculated individual values of the properties in the portfolio are then aggregated (step 714).

Financial transaction data for the real estate properties in the portfolio is received (step 716) and can be used in conjunction with the aggregated valuations of the properties to calculate a net asset value (NAV) of the portfolio of properties (step 718). The NAV can be calculated according to time series analysis and Kalman filtering. In addition, a bias correction can be calculated for the NAV to account for missing data in the training dataset.

Figure 8:
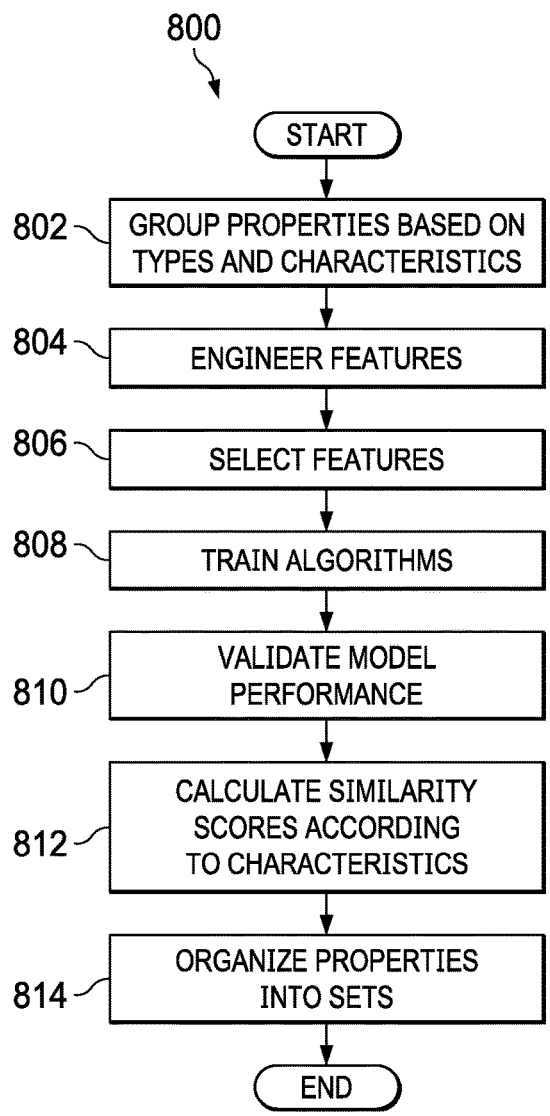
FIG. 8 is an illustration of a flowchart for a process of building an automated valuation model in accordance with an illustrative embodiment.

FIG. 8 illustrates a flowchart for a process of building an automated valuation model in accordance with an illustrative embodiment. Process 800 is a more detailed depiction of step 708 in FIG. 7.

Process 800 begins by grouping real estate properties in the historic dataset according to specified types and characteristics (step 802). Then features are engineered (step 804) and selected (step 806). Feature engineering comprises using domain knowledge of the dataset to create features (attributes) that are shared by all independent units in a dataset upon which prediction is to be performed. Feature selection is the process of determining which features are redundant and/or irrelevant with regard to predictive accuracy.

A number of modeling algorithms can then be trained according to the property grouping, engineered features, and selected features (step 808). Model performance can then be validated with testing data (step 810).

The building of the automated valuation model might further comprise calculating a number of similarity scores between real estate properties according to characteristics (step 812) and organizing real estate properties into a number of sets according to their similarity scores (step 814).

Figure 9:
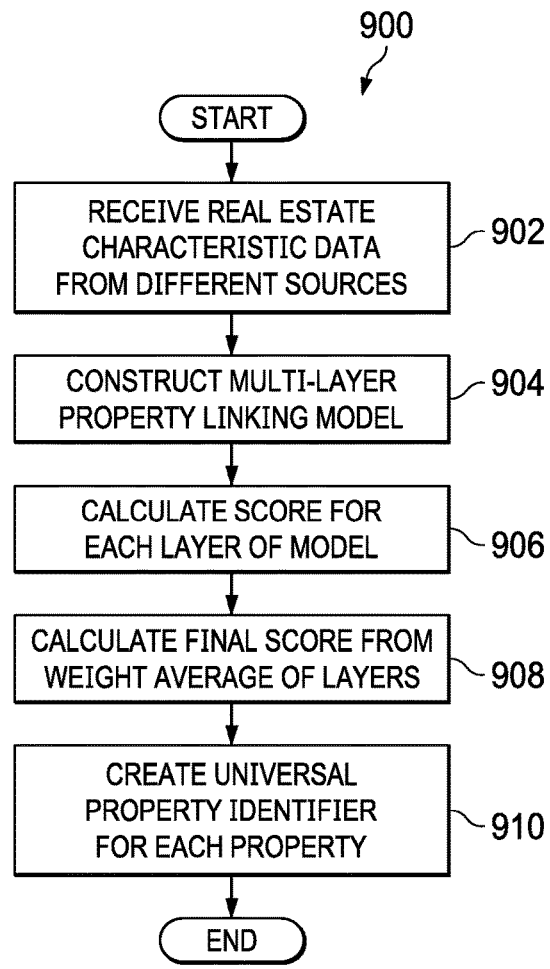
FIG. 9 is an illustration of a flowchart of a process for property linking in accordance with an illustrative embodiment.

FIG. 9 illustrates a flowchart of a process for property linking in accordance with an illustrative embodiment. Process 900 is a detailed depiction of a subprocess in step 704 in FIG. 7. Because historic real estate data might come from a number of different information sources, there is a possibility that these different sources might overlap in some of the properties contained in their respective datasets. Process 900 determines when an overlap occurs wherein different data sources refer to the same piece of property. Such overlaps in references to the same property can therefore be removed from the training dataset for the valuation model to prevent multiple inclusions of the same property. Overlapping references are eliminated by creating a unique identifier for each real estate property across all data sources.

Process 900 begins by receiving real estate property characteristic data from a number of different data sources, wherein the different data sources might use different classification categories (step 902). A multi-layer linking model is constructed that correlates the different data sources (step 904). For example, the multi-layer model might comprise one layer that finds exact address matches between data sources. Another layer might find relaxed address matches between data sources. For example, in a relaxed match, if there is an error in or missing street number, if the street names match and geographical distances are close enough within a threshold two references are likely for the same property. Another layer might find geographic coordinate matches (i.e. latitude and longitude). Yet another layer might determine matches for other information such as, e.g., tenants, owners, transactions, etc.

A score is calculated for each layer of the multi-layer property linking model for each real estate property (step 906). A final score is then calculated from a weighted average of the scores for the layers (step 908). The final score determines whether records in different data sources refer to the same property. A confidence threshold might be established from the final score. This threshold might also be adjustable for different purposes. For example, if the user wants a low false-linking rate, a high confidence threshold will result in the algorithm generating less linked properties but with a higher confidence for those properties that are linked. Conversely, if the confidence threshold is set lower, the algorithm will generate more linked properties, but the number of false links will increase.

A universal property identifier (UPID) is created for each real estate property based on the final score (step 910).

Figure 10:
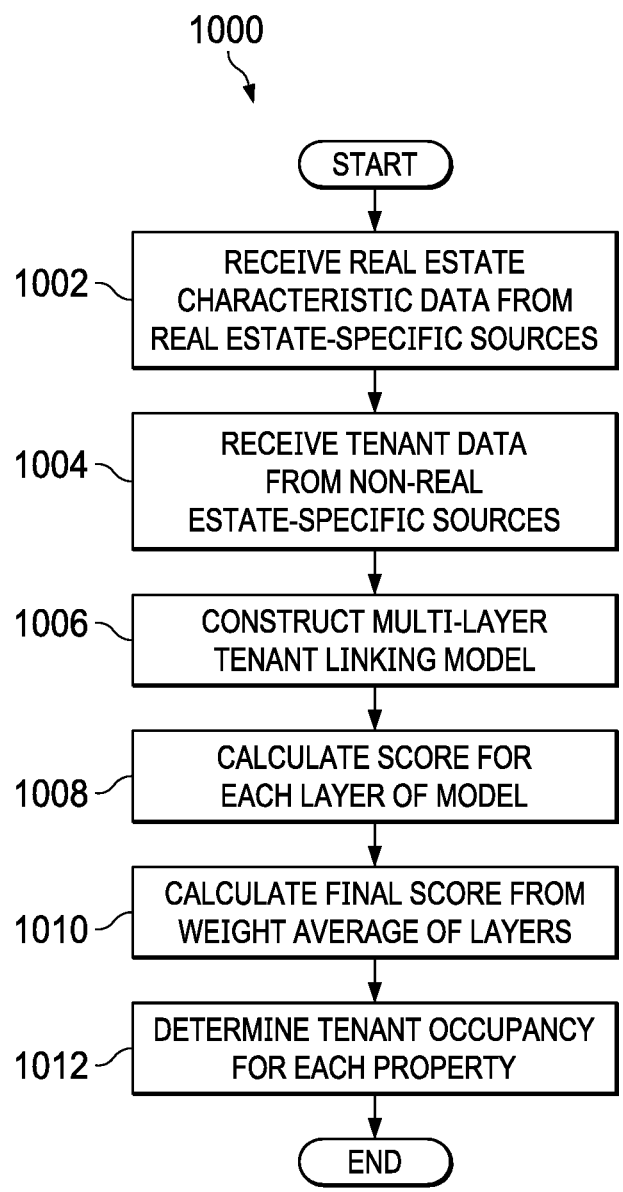
FIG. 10 is an illustration of a flowchart of a process for tenant linking in accordance with an illustrative embodiment.

FIG. 10 illustrates a flowchart of a process for tenant linking in accordance with an illustrative embodiment. Process 1000 is a detailed depiction of a subprocess in step 704 in FIG. 7. Real estate-specific data sources might not include information regarding all tenants occupying a given property. For example, a real estate-specific data source might only report up to five tenant names under a property, thereby underreporting tenant occupancy in the case of a large commercial real estate property. However, non-real estate-specific data sources such as business listings might contain records of real estate tenants not listed in the real estate-specific data sources. Process 1000 can correlate and link tenant data from business listing with property data from real estate-specific data sources to enhance coverage of tenants and determine whether a tenant resides in a given property.

Process 1000 begins by receiving real estate property characteristic data from a number of different real estate-specific data sources (step 1002). Tenant data is received from a number of non-real estate-specific data sources, wherein a subset of the non-real estate-specific data sources comprise tenant occupancy data not included in the real estate-specific data sources (step 1004).

A multi-layer tenant linking model is constructed that correlates tenant occupancy data from the real estate-specific data sources and non-real estate-specific data sources (step 1006). The model comprises multiple layers of decision rules with difference confidence levels, from highest to lowest, similar to the property linking model described above. One layer might find exact address matches (street name and address number) between data sources, thereby having the highest confidence level. Another layer might find relaxed matches wherein street name matches and geographical distances are close enough (within a threshold). This might be account for cases of missing street numbers or street number errors, abbreviations of street type (e.g., Ave., Blvd.), etc. Another layer finds geographic coordinate matches. If geographical distances are close enough and a business listing tenant name matches one of the existing tenants listed in the real estate-specific data sources, there is strong likelihood of other tenants in the business listing begin in that property as well.

A score is calculated for each layer of the multi-layer tenant linking model for each real estate property (step 1008). A final score is then calculated from a weighted average of the scores for the layers of the tenant linking model (step 1010). Based on an adjustable confidence threshold that suits different linking criteria, a tenant occupancy can be determined for each real estate property according to the final score (step 1012). By confidently linking tenant level information with property level information, the multi-layer linking model can account for tenants not listed in real estate-specific data sources.

Figure 11:
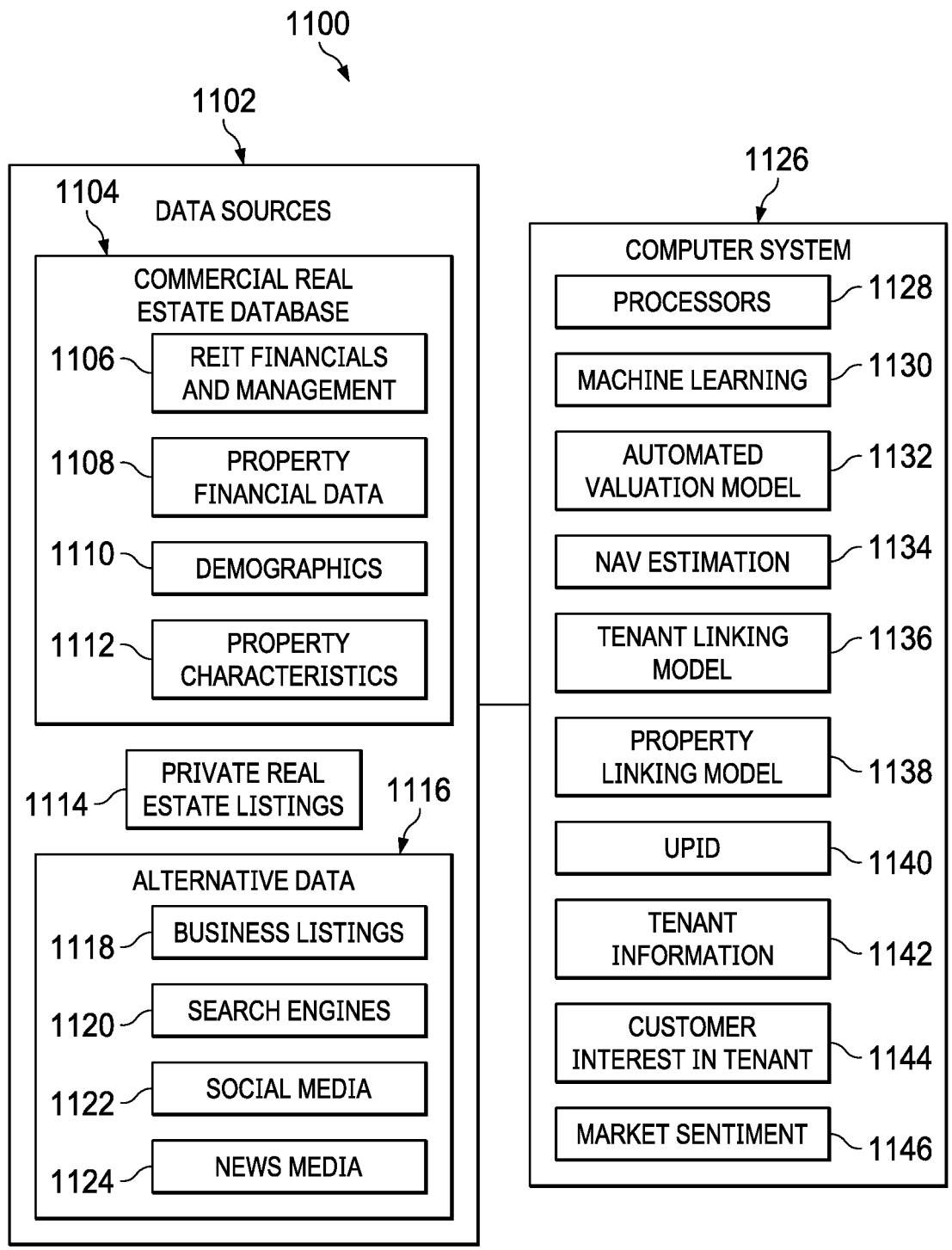
FIG. 11 is an illustration of a block diagram of a commercial real estate analytics system in accordance with an illustrative embodiment.

FIG. 11 illustrates a block diagram of a commercial real estate (CRE) analytics system in accordance with an illustrative embodiment. CRE analytics system 1100 might be implemented in network data processing system 100 shown in FIG. 1 and might be used to implement the operations shown in FIGS. 2-10.

CRE analytics system 1100 uses data from a number of different data sources 1102. These sources might include a CRE database 1104, private real estate listings 1114 (e.g., CoreLogic), and alternative data sources 1116 that are not real estate specific. The CRE database 1104 might comprises data that is specific to REITS such as REIT financials and management data 1106, property financial data 1108, demographics 1110, and property characteristics 1112.

Private real estate listings 1114 might comprises data that can be used to fill in gaps in data about specific properties that are not captured at the REIT level in CRE database 1104.

Alternative data sources 1116 might comprises business listings 1118, search engines 1120 and related databases (e.g., Google Trend, Wiki Pageview), social media 1122, and news media 1124. These alternative data sources 1116 might provide information about tenants and businesses from which information about commercial properties can be extrapolated.

Computer system 1126 uses information from the data sources 1102 to create a holistic view of commercial real estate and REITs. Computer system 1126 comprises one or more processors 1128 that implement machine learning 1130 that might comprise a number of algorithms and techniques such as, e.g., gradient boosting tree, random forest, time series analysis, and Kalman filtering.

Computer system 1126 might use machine learning 1130 to build an automatic valuation model (AVM) 1132 as described above using data from data sources 1102. Computer system 1126 can use AVM 1132 and data from sources 1102 to calculate a NAV estimation 1134 for a number of real estate properties such as those held by a REIT.

Computer system 1126 might also construct and implement a tenant linking model 1136 and property linking model 1138, which can be used to cross-reference entries in the different data sources 1102 and create universal property identifiers (UPID) 1140 for individual properties.

From alternative data sources 1116, computer system 1126 might also determine tenant information 1142, customer interest in a tenant's business 1144, and market sentiment regarding a tenant's business 1146.

Figure 12:
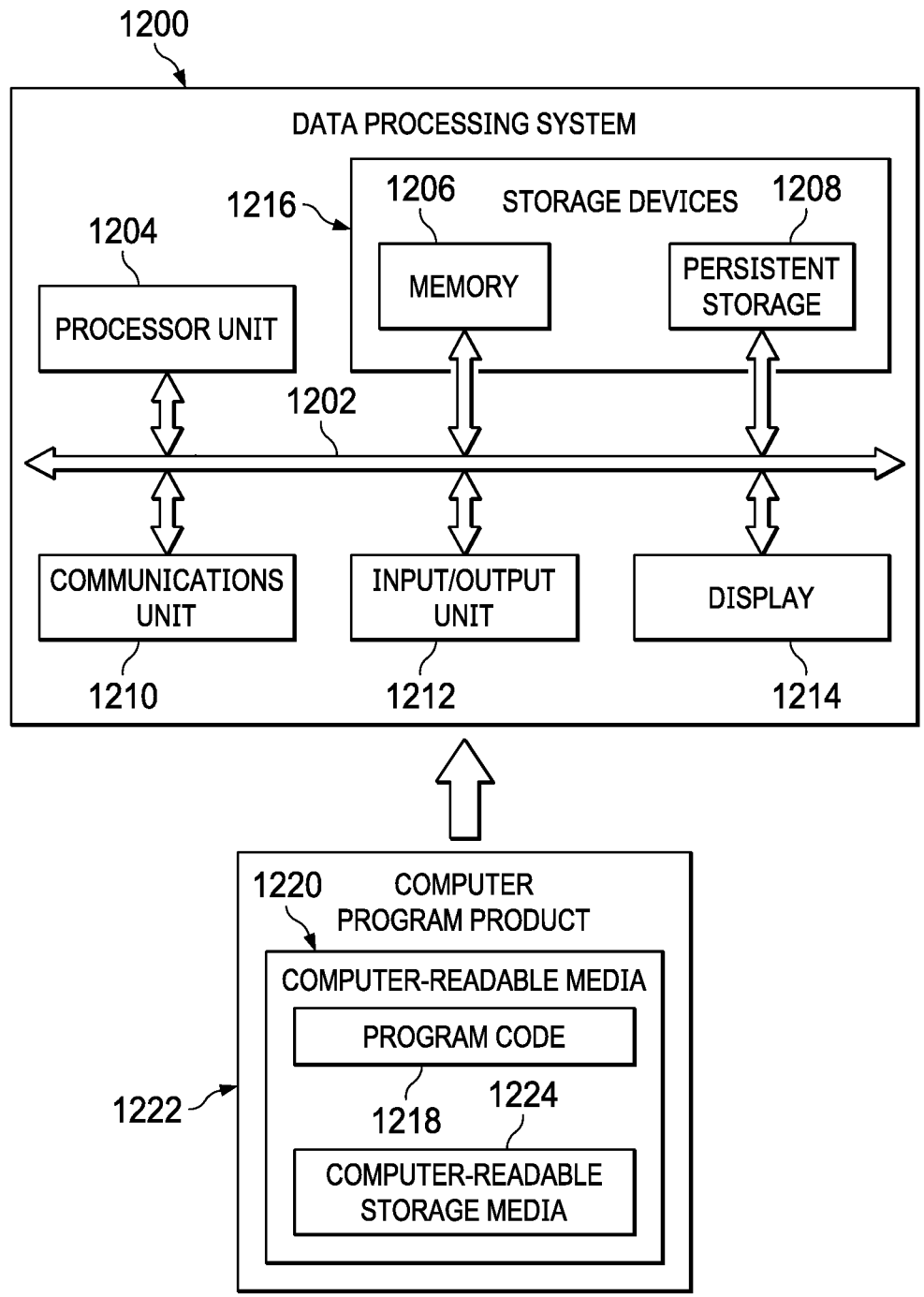
FIG. 12 is an illustration of a block diagram of a data processing system in accordance with an illustrative embodiment.

Turning now to FIG. 12, a block diagram of a data processing system is illustrated in accordance with an illustrative embodiment. Data processing system 1200 can be used to implement server computer 104, server computer 106, and client devices 110, in FIG. 1. In this illustrative example, data processing system 1200 includes communications framework 1202, which provides communications between processor unit 1204, memory 1206, persistent storage 1208, communications unit 1210, input/output (I/O) unit 1212 and display 1214. In this example, communications framework 1202 takes the form of a bus system.

Processor unit 1204 serves to execute instructions for software that can be loaded into memory 1206. Processor unit 1204 includes one or more processors. For example, processor unit 1204 can be selected from at least one of a multicore processor, a central processing unit (CPU), a graphics processing unit (GPU), a physics processing unit (PPU), a digital signal processor (DSP), a network processor, or some other suitable type of processor.

Memory 1206 and persistent storage 1208 are examples of storage devices 1216. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1216 may also be referred to as computer-readable storage devices in these illustrative examples. Memory 1206, in these examples, can be, for example, a random-access memory or any other suitable volatile or non-volatile storage device. Persistent storage 1208 may take various forms, depending on the particular implementation.

For example, persistent storage 1208 may contain one or more components or devices. For example, persistent storage 1208 can be a hard drive, a solid-state drive (SSD), a flash memory, a rewritable optical disk, a rewritable magnetic tape, or some combination of the above. The media used by persistent storage 1208 also can be removable. For example, a removable hard drive can be used for persistent storage 1208.

Communications unit 1210, in these illustrative examples, provides for communications with other data processing systems or devices. In these illustrative examples, communications unit 1210 is a network interface card.

Input/output unit 1212 allows for input and output of data with other devices that can be connected to data processing system 1200. For example, input/output unit 1212 may provide a connection for user input through at least one of a keyboard, a mouse, or some other suitable input device. Further, input/output unit 1212 may send output to a printer. Display 1214 provides a mechanism to display information to a user.

Instructions for at least one of the operating system, applications, or programs can be located in storage devices 1216, which are in communication with processor unit 1204 through communications framework 1202. The processes of the different embodiments can be performed by processor unit 1204 using computer-implemented instructions, which may be located in a memory, such as memory 1206.

These instructions are referred to as program code, computer usable program code, or computer-readable program code that can be read and executed by a processor in processor unit 1204. The program code in the different embodiments can be embodied on different physical or computer-readable storage media, such as memory 1206 or persistent storage 1208.

Program code 1218 is located in a functional form on computer-readable media 1220 that is selectively removable and can be loaded onto or transferred to data processing system 1200 for execution by processor unit 1204. Program code 1218 and computer-readable media 1220 form computer program product 1222 in these illustrative examples. In the illustrative example, computer-readable media 1220 is computer-readable storage media 1224.

In these illustrative examples, computer-readable storage media 1224 is a physical or tangible storage device used to store program code 1218 rather than a medium that propagates or transmits program code 1218.

Alternatively, program code 1218 can be transferred to data processing system 1200 using a computer-readable signal media. The computer-readable signal media can be, for example, a propagated data signal containing program code 1218. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1220" can be singular or plural. For example, program code 1218 can be located in computer-readable media 1220 in the form of a single storage device or system. In another example, program code 1218 can be located in computer-readable media 1220 that is distributed in multiple data processing systems. In other words, some instructions in program code 1218 can be located in one data processing system while other instructions in in program code 1218 can be located in one data processing system. For example, a portion of program code 1218 can be located in computer-readable media 1220 in a server computer while another portion of program code 1218 can be located in computer-readable media 1220 located in a set of client computers.

The different components illustrated for data processing system 1200 are not meant to provide architectural limitations to the manner in which different embodiments can be implemented. The different illustrative embodiments can be implemented in a data processing system including components in addition to or in place of those illustrated for data processing system 1200. Other components shown in FIG. 12 can be varied from the illustrative examples shown. The different embodiments can be implemented using any hardware device or system capable of running program code 1218.

The description of the different illustrative embodiments has been presented for purposes of illustration and description and is not intended to be exhaustive or limited to the embodiments in the form disclosed. In some illustrative examples, one or more of the components may be incorporated in or otherwise form a portion of, another component. For example, memory 1206, or portions thereof, may be incorporated in processor unit 1204 in some illustrative examples.

Thus, illustrative embodiments by method, apparatus, system, and computer program product for training an artificial intelligence system to recognize the concept. In one illustrative example, an automated process for creating a training data set comprising documents is performed in a manner that provides an information-rich training data sample for training an artificial intelligence model.

Further, in the illustrative example, artificial intelligence models can be trained by processing this automatically generated training data. In illustrative example, the training of the artificial intelligence model can be performed in a manner that enables artificial intelligence models trained to cover a more diverse set of concepts and to be much larger than those created using current processes. Further, the training data sets generated in the illustrative examples can provide artificial intelligence models that are more accurate, robust, and able to serve a wider range of applications as compared to artificial intelligence models generated current training techniques.

The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method of automated property value calculation, the method comprising:
one or more processors to performing the steps of:
receiving historic financial transaction data for a first number of real estate properties over a specified time frame;
receiving characteristic data regarding the first number of real estate properties, wherein the characteristic data comprises a number of defined categories;
creating features for the first number of real estate properties, wherein the features are attributes that are shared by all units of the first number of real estate properties;
receiving historic demographic data for a number of demographic parameters over the specified time frame, wherein the historic demographic data corresponds to defined geographic regions in which the first number of real estate properties are located;
extracting market sentiment regarding the first number of real estate properties from unstructured data sources;
determining tenant information from a tenant mapping related to the first number of real estate properties;
building and training a predictive valuation model based on the historic financial transaction data, the characteristic data, the features, and the historic demographic data;
calculating individual values for a second number of real estate properties with the predictive valuation model according to characteristics of the second number of real estate properties, wherein the calculation of individual values for the second number of real estate properties further considers the market sentiment and the tenant information of the first number of real estate properties;
aggregating the individual values of the second number of real estate properties;
receiving financial transaction data for the second number of real estate properties in real time as the financial transaction data for the second number of real estate properties come to market; and
calculating a net asset value of the second number of real estate properties according to the aggregated individual values and the financial transaction data for the second number of real estate properties; and
after training the predictive valuation model:
receiving new real estate financial transaction data, new real estate characteristic data, and new demographic data at specified periodic time intervals; and
retraining the predictive valuation model based on the new real estate financial transaction data, the new real estate characteristic data, and the new demographic data for each specified time interval.

2. The method of claim 1, wherein training the predictive valuation model comprises:
grouping properties according to specified types and characteristics;
engineering features;
selecting features;
training a number of modeling algorithms according to the property grouping, engineered features, and selected features; and
validating model performance.

3. The method of claim 2, further comprising:
calculating a number of similarity scores between real estate properties according to characteristics; and
organizing real estate properties into a number of sets according to their similarity scores.

4. The method of claim 1, further comprising calculating a bias correction for the calculated net asset value.

5. The method of claim 1, wherein the net asset valuation is calculated according to time series analysis and Kalman filtering.

6. The method of claim 1, wherein receiving the characteristic data further comprises:
receiving the characteristic data from a number of different data sources, wherein the different data sources use different classification categories;
constructing a multi-layer property linking model that correlates the different data sources;
calculating a score for each layer of the multi-layer property linking model for each real estate property;
calculating a final score from a weighted average of the scores for the layers of the multi-layer property linking model; and
creating a universal property identifier for each real estate property based on the final score.

7. The method of claim 6, wherein the final score determines if records in different data sources refer to the same real estate property.

8. The method of claim 1, wherein receiving the characteristic data further comprises:
receiving characteristic data from a number of real estate-specific data sources;
receiving tenant data from a number of non-real estate-specific data sources, wherein a subset of the non-real estate-specific data sources comprise tenant occupancy data not included in the real estate-specific data sources;
constructing a multi-layer tenant linking model that correlates tenant occupancy data from the real estate-specific data sources and non-real estate-specific data sources;
calculating a score for each layer of the multi-layer tenant linking model for each real estate property;
calculating a final score from a weighted average of the scores for the layers of the multi-layer tenant linking model; and
determining tenant occupancy for each real estate property according to the final score.

9. A system for automated property value calculation, the system comprising:
a storage device configured to store program instructions; and
one or more processors operably connected to the storage device and configured to execute the program instructions to cause the system to:
receive historic financial transaction data for a first number of real estate properties over a specified time frame;
receive characteristic data regarding the first number of real estate properties, wherein the characteristic data comprises a number of defined categories;
create features for the first number of real estate properties, wherein the features are attributes that are shared by all units of the first number of real estate properties;
receive historic demographic data for a number of demographic parameters over the specified time frame, wherein the historic demographic data corresponds to defined geographic regions in which the first number of real estate properties are located;

extract market sentiment regarding the first number of real estate properties from unstructured data sources;
determining tenant information from a tenant mapping related to the first number of real estate properties;
build and train a predictive valuation model based on the historic financial transaction data, the characteristic data, the features, and the historic demographic data;
calculate individual values for a second number of real estate properties with the predictive valuation model according to characteristics of the second number of real estate properties, wherein the calculation of individual values for the second number of real estate properties further considers the market sentiment and the tenant information of the first number of real estate properties;
aggregate the individual values of the second number of real estate properties;
receive financial transaction data for the second number of real estate properties in real time as the financial transaction data for the second number of real estate properties come to market;
calculate a net asset value of the second number of real estate properties according to the aggregated individual values and the financial transaction data for the second number of real estate properties; and
after training the predictive valuation model:
receive new real estate financial transaction data, new real estate characteristic data, and new demographic data at specified periodic time intervals; and
retrain the predictive valuation model based on the new real estate financial transaction data, the new real estate characteristic data, and the new demographic data for each specified time interval.

10. The system of claim 9, wherein training the predictive valuation model comprises:
grouping properties according to specified types and characteristics;
engineering features;
selecting features;
training a number of modeling algorithms according to the property grouping, engineered features, and selected features; and
validating model performance.

11. The system of claim 10, further comprising:
calculating a number of similarity scores between real estate properties according to characteristics; and
organizing real estate properties into a number of sets according to their similarity scores.

12. The system of claim 9, further comprising calculating a bias correction for the calculated net asset value.

13. The system of claim 9, wherein the net asset valuation is calculated according to time series analysis and Kalman filtering.

14. The system of claim 9, wherein receiving the characteristic data further comprises:
receiving the characteristic data from a number of different data sources, wherein the different data sources use different classification categories;
constructing a multi-layer property linking model that correlates the different data sources;
calculating a score for each layer of the multi-layer property linking model for each real estate property;
calculating a final score from a weighted average of the scores for the layers of the multi-layer property linking model; and
creating a universal property identifier for each real estate property based on the final score.

15. The system of claim 14, wherein the final score determines if records in different data sources refer to the same real estate property.

16. The system of claim 9, wherein receiving the characteristic data further comprises:
receiving characteristic data from a number of real estate-specific data sources;
receiving tenant data from a number of non-real estate-specific data sources, wherein a subset of the non-real estate-specific data sources comprise tenant occupancy data not included in the real estate-specific data sources;
constructing a multi-layer tenant linking model that correlates tenant occupancy data from the real estate-specific data sources and non-real estate-specific data sources;
calculating a score for each layer of the multi-layer tenant linking model for each real estate property;
calculating a final score from a weighted average of the scores for the layers of the multi-layer tenant linking model; and
determining tenant occupancy for each real estate property according to the final score.

17. A computer program product for automated property value calculation, the computer program product comprising:
a non-volatile computer readable storage medium having program instructions stored thereon to perform the steps of:
receiving historic financial transaction data for a first number of real estate properties over a specified time frame;
receiving characteristic data regarding the first number of real estate properties, wherein the characteristic data comprises a number of defined categories;
creating features for the first number of real estate properties, wherein the features are attributes that are shared by all units of the first number of real estate properties;
receiving historic demographic data for a number of demographic parameters over the specified time frame, wherein the historic demographic data corresponds to defined geographic regions in which the first number of real estate properties are located;
extracting market sentiment regarding the first number of real estate properties from unstructured data sources;
determining tenant information from a tenant mapping related to the first number of real estate properties;
building and training a predictive valuation model based on the historic financial transaction data, the characteristic data, the features, and the historic demographic data;
calculating individual values for a second number of real estate properties with the predictive valuation model according to characteristics of the second number of real estate properties, wherein the calculation of individual values for the second number of real estate properties also considers the market sentiment and the tenant information of the first number of real estate properties;
aggregating the individual values of the second number of real estate properties;
receiving financial transaction data for the second number of real estate properties in real time as the financial transaction data for the second number of real estate properties come to market;
calculating a net asset value of the second number of real estate properties according to the aggregated individual values and the financial transaction data for the second number of real estate properties; and after training the predictive valuation model:

receiving new real estate financial transaction data, new real estate characteristic data, and new demographic data at specified periodic time intervals; and retraining the predictive valuation model based on the new real estate financial transaction data, the new real estate characteristic data, and the new demographic data for each specified time interval.

18. The method of claim 1, further comprises:

identifying, using the tenant mapping and market sentiment, anchor tenants in commercial real estate properties from the first number of real estate properties, customer interest in tenants' business, and market sentiment about tenants' business.

19. The system of claim 9, further comprise:

identifying, using the tenant mapping and market sentiment, anchor tenants in commercial real estate properties from the first number of real estate properties, customer interest in tenants' business, and market sentiment about tenants' business.

* * * * *